United States Patent
Barsness et al.

(10) Patent No.: US 7,921,220 B2
(45) Date of Patent: Apr. 5, 2011

(54) REDUCING OCCURRENCES OF TWO-PHASE COMMITS IN A MULTI-NODE COMPUTING SYSTEM

(75) Inventors: Eric L. Barsness, Pine Island, MN (US); David L. Darrington, Rochester, MN (US); Amanda Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/353,503

(22) Filed: Jan. 14, 2009

(65) Prior Publication Data

US 2010/0180024 A1   Jul. 15, 2010

(51) Int. Cl.
*G06F 15/16* (2006.01)
(52) U.S. Cl. .................. 709/230; 709/205
(58) Field of Classification Search .......... 709/205, 709/230
See application file for complete search history.

(56) References Cited

U.S. PATENT DOCUMENTS

| 6,105,147 | A * | 8/2000 | Molloy ................ 714/16 |
| 6,983,395 | B2 * | 1/2006 | Chen et al. ............ 714/4 |
| 7,395,264 | B2 * | 7/2008 | Long et al. ............ 707/703 |
| 7,693,882 | B2 * | 4/2010 | Lee et al. ............. 707/634 |
| 2002/0087366 | A1 * | 7/2002 | Collier et al. .......... 705/5 |
| 2008/0092139 | A1 * | 4/2008 | Ruby .................. 718/101 |

* cited by examiner

*Primary Examiner* — Patrice L Winder
(74) *Attorney, Agent, or Firm* — Patterson & Sheridan, LLP

(57) ABSTRACT

Techniques are disclosed for reducing the number of two-phase commits required to perform atomic transactions in a multi-node system. By monitoring atomic operations that require two-phase commit protocols, a system may identify when it would be beneficial to consolidate data onto single (or at least fewer) compute node(s). In doing so, a less compute intensive commit protocol, such as a one-phase commit protocol may be used. Moreover, in situations where data consolidation is not available, the data may be migrated to compute nodes having a closer proximity. Thus, in such cases, network response times for two-phase commits required for an atomic operation may be reduced, thereby increasing the performance of a multi-node system.

24 Claims, 6 Drawing Sheets

REDUCING OCCURRENCES OF TWO-PHASE COMMITS IN A MULTI-NODE COMPUTING SYSTEM

BACKGROUND OF THE INVENTION

1. Field of the Invention

Embodiments of the invention relate to improving the efficiency of multi-node computing systems. More specifically, embodiments of the invention may reduce the overhead caused by performing two-phase commits in a multi-node computing system.

2. Description of the Related Art

An atomic operation may refer to a set of interdependent transactions that can be combined so that they appear to the rest of the system to be a single operation. Atomicity in a computing system is frequently required to guarantee that a series of interdependent transactions are either all performed successfully or all canceled successfully. That is, an atomic transaction either occurs completely, or not at all, but should never occur in part.

For example, in a consumer banking application, an account holder may wish to transfer $500 from his or her savings account to his or her checking account. This transaction actually involves a pair of operations. The first operation is to remove (or debit) $500 from the savings account. The second operation is to add (or credit) $500 to the checking account. Both the bank and the account holder want to ensure that if the bank's computer system crashed in the middle of this transfer, there is a way to make sure that either the $500 is posted to the checking account, or, alternatively, that the $500 is not removed from the savings account. It is unacceptable if the funds are removed from savings, but are not credited to checking. In other words, this transaction requires a mechanism to guarantee "atomicity."

In systems where a single participant (i.e., a single computing entity such as a database) is involved in performing a series of transactions, a one-phase commit protocol can be used to achieve atomicity. In this case, the single participant performs each transaction in the series. The participant is said to "commit" the transaction if all the steps are completed successfully. On the other hand, if some of the transactions fail, e.g., should the computing system "crash" in the middle of performing the steps, the participant performs a "rollback," where any of the steps that were performed are undone.

In other cases, however, multiple participants may be involved in performing a series of steps related to an atomic transaction. For example, the steps may span a plurality of computing nodes in a multi-node computing environment. A two-phase commit protocol may be used to perform an atomic transaction in a these types of distributed computing environments.

SUMMARY OF THE INVENTION

One embodiment of the invention includes a computer-implemented method for reducing a number of two-phase commits required for atomic transactions performed on a multi-node computing system. The method may generally include monitoring at least one atomic operation performed by at least a first compute node and a second compute node of the multi-node system, where the atomic operation is committed using a two-phase commit. The method may also include identifying data stored by the first and second compute node accessed in performing the atomic transaction. Upon determining that the identified data on the first compute node and second compute node can be consolidated to a single compute node, the identified data is consolidated to the single compute node. Once consolidated, subsequent atomic transactions performed using the consolidated data on the single compute node are committed using a one-phase commit.

Another embodiment of the invention includes a computer-readable storage medium containing a program which, when executed, performs an operation for reducing a number of two-phase commits required for atomic transactions performed on a multi-node computing system. The operation may generally include monitoring at least one atomic operation performed by at least a first compute node and a second compute node of the multi-node system, where the atomic operation is committed using a two-phase commit. The operation may also include identifying data stored by the first and second compute node accessed in performing the atomic transaction. Upon determining that the identified data on the first compute node and second compute node can be consolidated to a single compute node, the identified data is consolidated to the single compute node. Once consolidated, subsequent atomic transactions performed using the consolidated data on the single compute node are committed using a one-phase commit.

Still another embodiment of the invention includes a parallel computing system having a plurality of compute nodes each having at least a processor and a memory. Each of the compute nodes may store configured to perform one or more steps of an atomic transaction using data stored on a respective one or more compute nodes. The system may also include an atomic transaction monitoring node, having at least a processor and a memory storing a program configured to perform an operation for reducing a number of two-phase commits required for atomic transactions performed on the plurality of compute nodes. The operation performed by the program may generally include monitoring at least one atomic operation performed by at least a first compute node and a second compute node of the multi-node system, where the atomic operation is committed using a two-phase commit. The operation performed by the program may generally include identifying data stored by the first and second compute node accessed in performing the atomic transaction. Upon determining that the identified data on the first compute node and second compute node can be consolidated to a single compute node, the identified data is consolidated to the single compute node. Once consolidated, subsequent atomic transactions performed using the consolidated data on the single compute node are committed using a one-phase commit.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
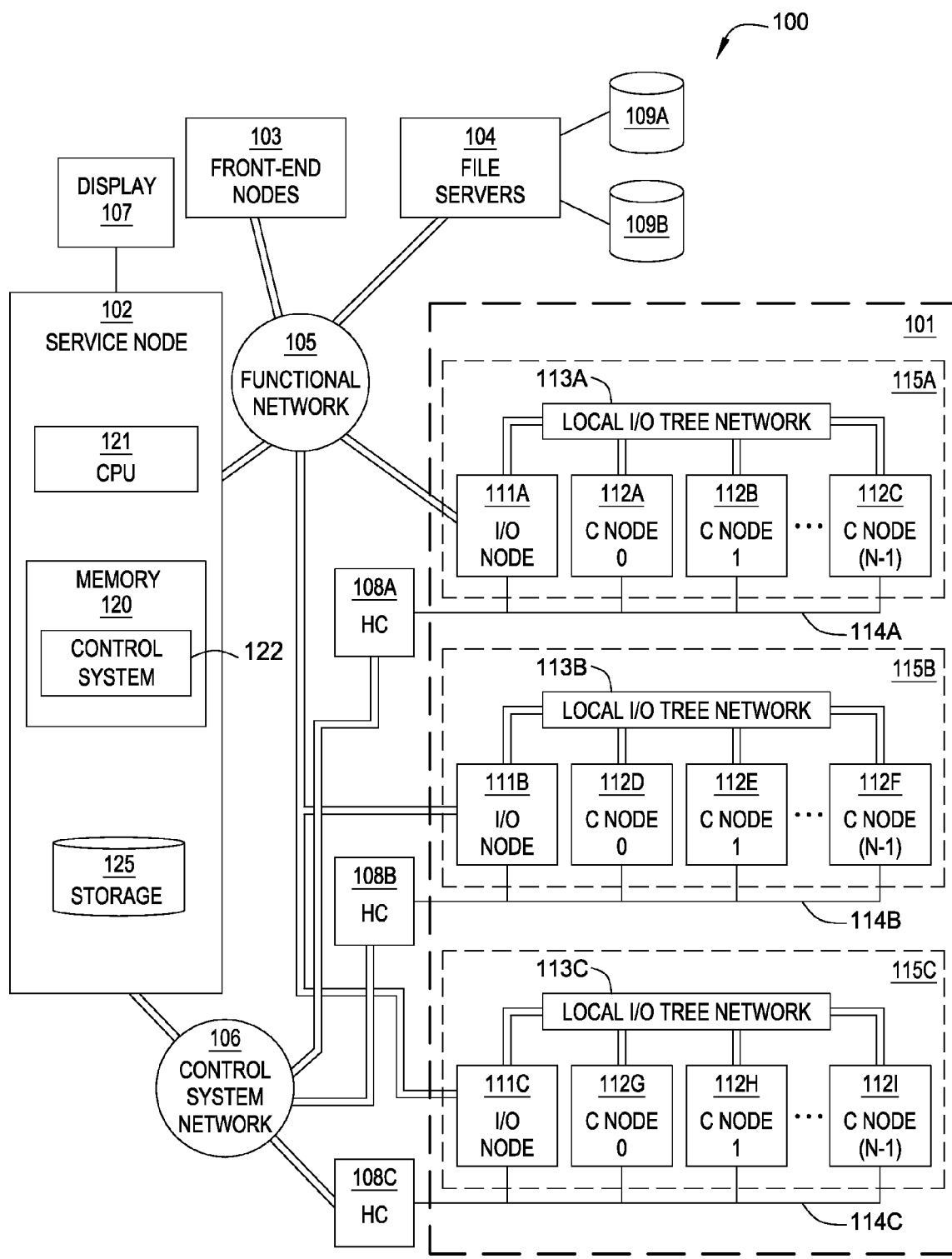
FIG. 1 is a block diagram illustrating components of a massively parallel computer system, according to one embodiment of the invention.

A two-phase commit protocol coordinates multiple nodes performing a single atomic transaction across multiple computing nodes in a distributed computing environment. The two phases of the algorithm include a commit-request phase and the commit phase. In the commit-request phase, an initiator instructs a group of nodes to perform a respective set of steps of the atomic transaction and wait until a notification is received from each node that the steps have been performed successfully or have failed (or timed out). Each participating node completes its respective transactions up to a point where they are ready to commit.

During the commit phase, if the initiator receives a notification indicating success from each of the nodes, the initiator sends a commit message to all the nodes. In response, each node commits their respective steps and sends an acknowledgement to the initiator. The initiator then commits the overall atomic transaction after all acknowledgements have been received. However, if the initiator receives a notification indicating failure from any of the nodes, the initiator sends a rollback message to all the nodes. In response, each node undoes whatever steps were perfumed and sends an acknowledgement to the initiator. The initiator then responds indicating that the atomic transaction failed to commit after all acknowledgments have been received. As should be apparent from this description, performing an atomic transaction using the two-phase commit protocol, while effective for its intended purpose, requires substantial communication overhead.

Embodiments of the invention may be used to reduce the number of occurrences of a two-phase commit needed for atomic transactions performed by a multi-node system. For example, in one embodiment, an atomic transaction may be monitored to identify data accessed across multiple compute nodes. Once identified, the data may be consolidated to a single compute node. In this case, a one-phase commit protocol may be used instead of a two-phase commit protocol because all the data needed for a reoccurring transaction may be available on a single compute node.

In another embodiment, in cases where data can not be consolidated to a single node, data may be migrated to a cluster of compute nodes that are within close proximity to one another or reduce the number of nodes which the data is spread across. In this case, while a two-phase commit protocol may still be needed, the network response time for the messages communicating between the compute nodes or the overall number of nodes participating in the two-phase commit may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O operations. Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions. Illustratively, memory 120 also includes a control system 122. In embodiments of the invention, Control system 122 may be a software application configured to control the allocation of compute nodes 112 in compute core 101, direct the loading of application and data on compute nodes 111, and perform diagnostic and maintenance functions, among other things.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, network performance and/or network state data may be gathered and transmitted to service node 102 without affecting the performance of that application.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

As stated, in a massively parallel computer system 100, compute nodes 112 may be logically arranged in a three-dimensional torus, where each compute node 112 may be identified using an x, y and z coordinate.

Figure 2:
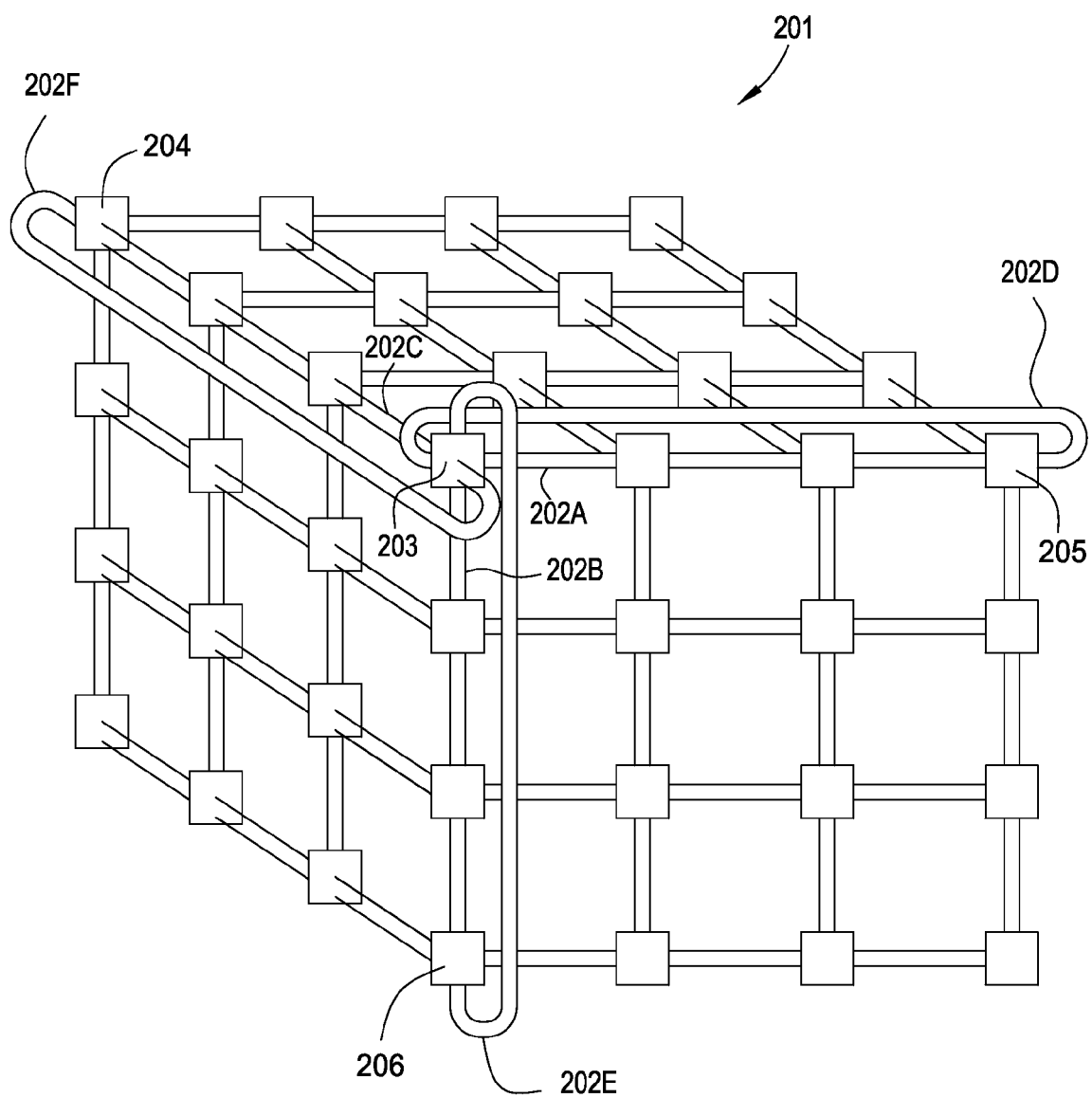
FIG. 2 illustrates an example of a three-dimensional torus network, according to one embodiment of the invention.

FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 112 along with and an additional 1024 I/O nodes 111. Illustratively, each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
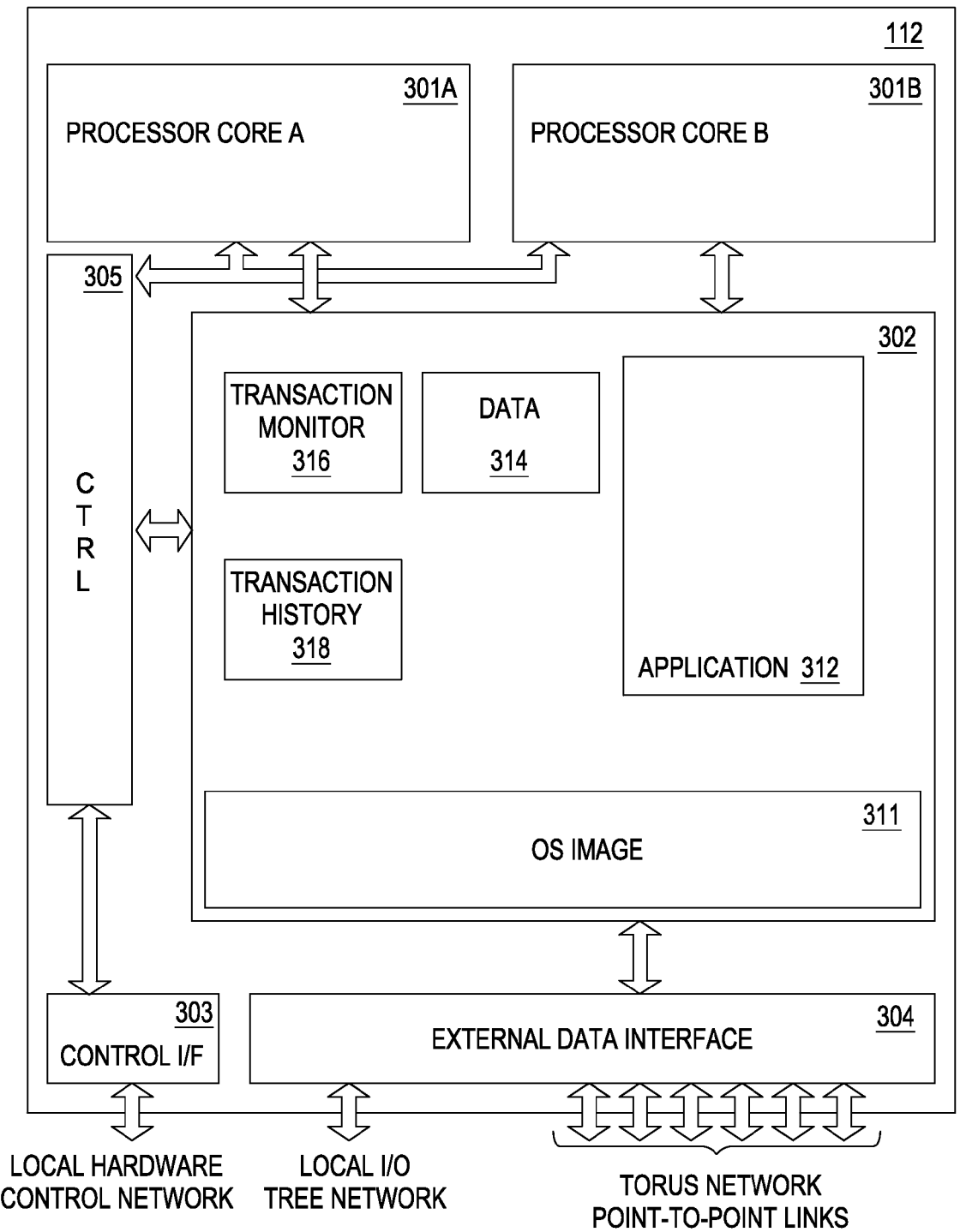
FIG. 3 illustrates an example of a compute node of the system of FIG. 1, according to one embodiment of the invention.

FIG. 3 illustrates components of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311. Operating system image 311 provides a copy of a simplified-function operating system running on compute node 112, referred to as a compute node kernel. The compute node kernel provides a set of functions required to support operation of the compute node 112.

Illustratively, memory 302 also includes an application 312 executing on the compute node 112. In one embodiment, the application 312 may be a database application which accesses data 314 containing various information for customer banking accounts. The data 314 may be a database table containing customer ID's, account balances, account type, and the like. In one embodiment, data 314 may span across multiple compute nodes 112. For example, data specific to a customer's checking account(s) may be located on one compute node 112, while data specific to the customer's savings account(s) may be located on another compute node 112. Of course, one of ordinary skill in the art will recognize that an in-memory database on a parallel computing system is just one example of a system where a two-phase commit protocol may be required to provide atomicity to certain transactions that involve actions performed on multiple compute nodes 112.

In this case, when performing an atomic transaction, e.g., a transaction to transfer money from a customer's savings account to the customer's checking account, the application 312 may distribute the series of transactions related to the operation across the compute nodes. For example, the first transaction may debit the dollar amount from the savings account information located in one compute node 112, while the second transaction credits the dollar amount to the checking account information located in another compute node 112. As mentioned earlier, atomicity may be required to ensure that the money transfer completes successfully or fails, leaving the system unchanged. Because the money transfer transaction requires a plurality of participants (i.e. the compute node containing checking account information and the compute node containing savings account information), a two-phase commit protocol may be used to guarantee atomicity.

However, as mentioned earlier, the system 100 incurs substantial overhead performing two-phase commits. Therefore, embodiments of the invention provide methods to reduce the number of two-phase commits that occur in the system 100. For example, in one embodiment, data 314 spanning multiple compute nodes 112 may be consolidated to a single compute node 112. In this case, a simpler commit protocol, such as a one-phase commit protocol may be used to guarantee atomicity because only a single compute node 112 is required to perform atomic transactions using the data consolidated to that compute node 112. (i.e. the debiting from the savings account and the crediting of the checking account).

In another embodiment, if a particular collection of data cannot be consolidated to a single node (for example, due to memory constraints of the single node 112), data may be migrated to a cluster of compute nodes 112 that are within close proximity. In this case, while a two-phase commit protocol may still be needed, the network response time for messages communicating between the compute nodes 112 may be reduced. Similarly, if a collection of data frequently used as part of an atomic transaction is widely spread across many compute nodes, simply reducing the number of nodes across which the data is spread may reduce the overhead required for a two-phase commit transaction.

As shown, compute node 112 includes a transaction monitor 316 which may be configured to monitor and consolidate data to one (or more) compute nodes 112. In such a case, compute node 112 may act as a central entity monitoring distributed transactions performed by other compute nodes 112 (e.g., a group of nodes storing an in-memory database). When an atomic operation is initiated, the transaction monitor 316 tracks transactions distributed to a group of compute nodes 112 and identifies the data 314 being accessed on those compute nodes 112. After identifying the data involved in a given transaction, the transaction monitor 316 may consolidate the data 314 onto a single compute node 112. As a result, subsequent atomic operations accessing the consolidated data 314 may use a one-phase commit to complete the operation instead of a two-phase commit. In another embodiment, the transaction monitor 316 may migrate identified data 314 to compute nodes 112 having close proximity. In this case, a two-phase commit may still be required to complete an atomic transaction, but the network response times for the compute nodes 112 involved in the operation may be reduced.

As shown, the compute node 112 may also include a transaction history 318. The transaction history 318 may store a variety of statistical information regarding past of atomic operations performed on this (or other) compute nodes that required a two-phase commit. In one embodiment, the statistical information may be collected by the transaction monitor 316. Examples of information collected include access frequency of data 314 on the compute nodes 112 and the execution time of the atomic operations.

In one embodiment, the transaction monitor 316 may be configured to consolidate data 314 that is frequently accessed during multiple atomic operations. In this case, an access frequency calculated for the data 314 may be compared to a predetermined threshold level. If the access frequency reaches or exceeds the threshold, then the data 314 may be consolidated to a single compute node 112 (or migrated to compute nodes 112 having a closer proximity).

In another embodiment, the transaction monitor 316 may be configured to perform data consolidation (or migration)

only for atomic operations requiring a two-phase commit that have execution times that reach or exceed a predetermined threshold. For example, execution times may be measured by the network response times for the compute nodes 112 involved in performing an atomic transaction requiring a two-phase commit. In such a case, if the network response times reaches or exceeds the threshold, then the data 314 may be consolidated to a single node 112, thereby removing the network response times altogether. Alternatively, the data 314 from the compute nodes 112 may be migrated to compute nodes 112 having a closer proximity, thereby reducing the network response times.

In still another embodiment, the transaction monitor 316 may be configured to prioritize the different atomic operations. In such a case, data consolidation or migration may occur only for atomic operations having a higher priority than other atomic operations. Therefore, higher priority atomic operations may use a one-commit phase protocol to guarantee atomicity, whereas lower priority atomic operations may use a two-commit phase protocol to guarantee atomicity.

Figure 4:
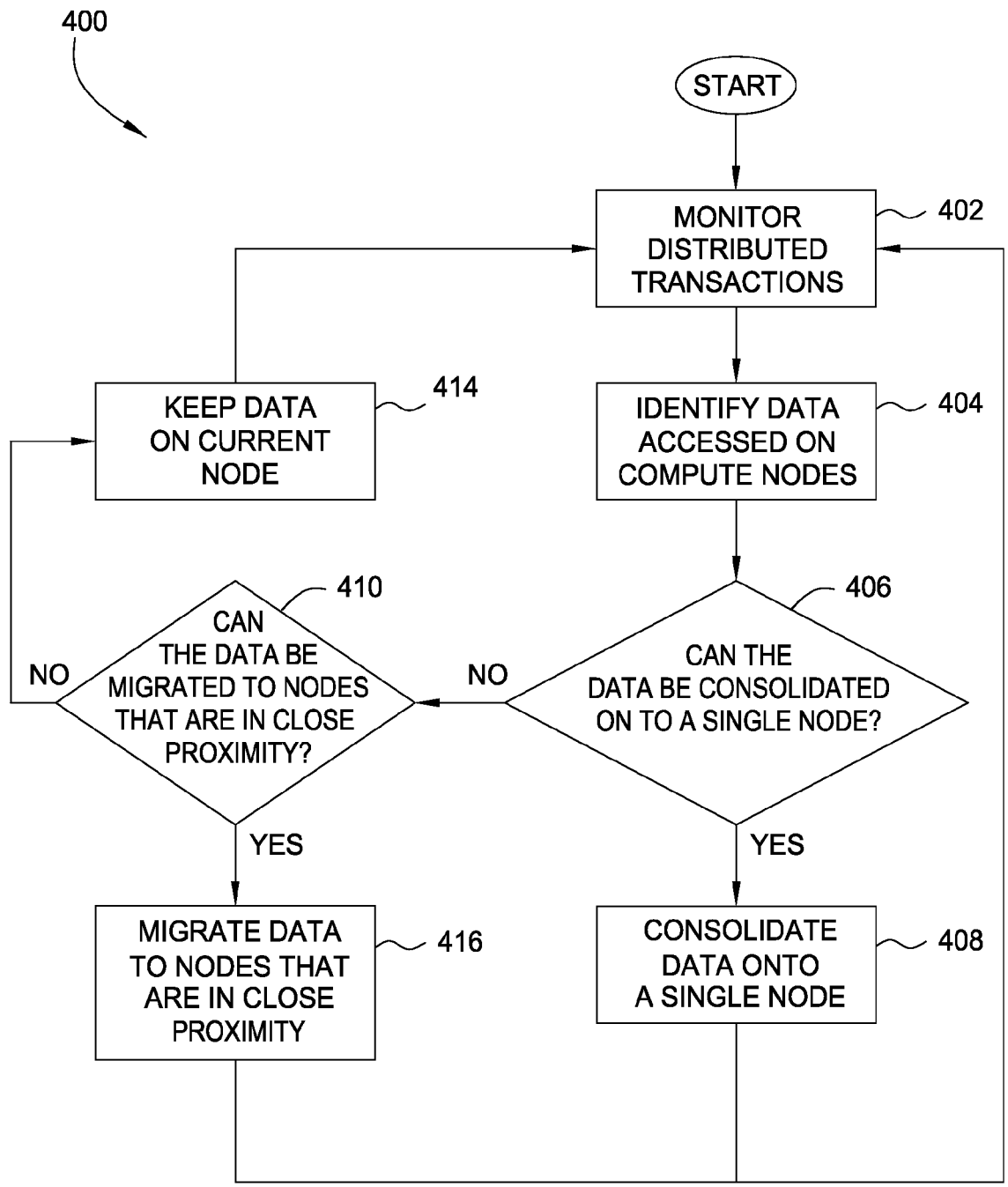
FIG. 4 is a flowchart illustrating a method for reducing occurrences of two-phase commits in a multi-node computing system, according to one embodiment of the invention.

FIG. 4 illustrates a method 400 for reducing the number of two-phase commits in a multi-node computing system, according to one embodiment of the invention. As shown, the method 400 begins at step 402, where the transaction monitor 316 monitors the performance of distributed transactions that require a two-phase commit. At step 404, after identifying an atomic transaction that required a two-phase commit, the compute nodes storing data related to the atomic transaction are identified. At step 406, the transaction monitor 316 determines if the data on the compute nodes identified at step 404 may be consolidated on a single compute node 112 to reduce the need for a two-phase commit in future transactions. In one embodiment, the transaction monitor 316 may perform a search for compute nodes 112 having enough memory 302 to store the identified data 314. If a compute node 112 having adequate memory 302 is found, then at step 408, the transaction monitor 316 may consolidate the data 314 to the single compute node 112.

For example, the transaction monitor may determine, after monitoring multiple atomic transactions that require a two-phase commit, that the atomic transactions consistently require data from a given database table spread across two (or more) nodes or consistently require data from different tables on spread across two (or more) nodes. In these (and other) cases, the data from such tables may be consolidated together on a single node (provided memory space is available). Alternatively, the data from two (or more) nodes may be migrated to a third node. Thus, the distributed computing environment may dynamically respond to what types of transactions are performed, allowing groups of data frequently accessed by a single transactions to, over time, "pool" together, reducing the need for two-phase commits. Of course, in one embodiment, a variety of configurable criteria may be used to determine whether to consolidate data from multiple compute nodes in order to reduce the occurrence of two-phase commits. For example, prior to consolidating data in two separate tables, the system may require that a certain number of transactions requiring a two-phase commit occur (or a certain percentage of overall transactions).

In another embodiment, the transaction monitor 316 may consolidate the data 314 stored on multiple compute nodes if it determines that the network response times between the compute nodes 112 involved in the atomic operation exceeds a predetermined threshold. For example, if two compute nodes are frequently used by an atomic transaction are physically (or logically) distinct from one other for purposes of data communication, then the data on one node may be moved to be closer to another. In any case, once the data has been consolidated, the operations return to step 402, where distributed transactions are monitored.

With continued reference to FIG. 4, if at step 406 it is determined that data 314 cannot be consolidated to a single compute node 112, then the method 400 continues to step 410, where it is determined if the data 314 can be migrated to compute nodes that have a closer proximity. For example, the transaction monitor 316 may determine the current proximity between the compute nodes 112 involved in the atomic operation. Once the level is determined, the transaction monitor 316 searches for other compute nodes 112 in the system 100 that have a closer proximity and are also available for data consolidation (i.e. have enough memory 302 to store the data 314). The transaction monitor 316 may first search for available compute nodes 112 having the closest possible proximity. If no compute nodes 112 are available at this level, the transaction monitor 316 may then search for available compute nodes 112 having a next level of proximity. If the transaction monitor 316 cannot find available compute nodes 112 having a lower level of proximity, then the data 314 may remain on the compute nodes 112 they currently reside on (step 414), and the method 400 returns to step 402 where additional distributed transactions of atomic operations are monitored. Alternatively, if the transaction monitor 316 finds available nodes having a lower level of proximity, then the data 314 may be migrated to the compute nodes 112 having the closer proximity (step 416).

Figure 5:
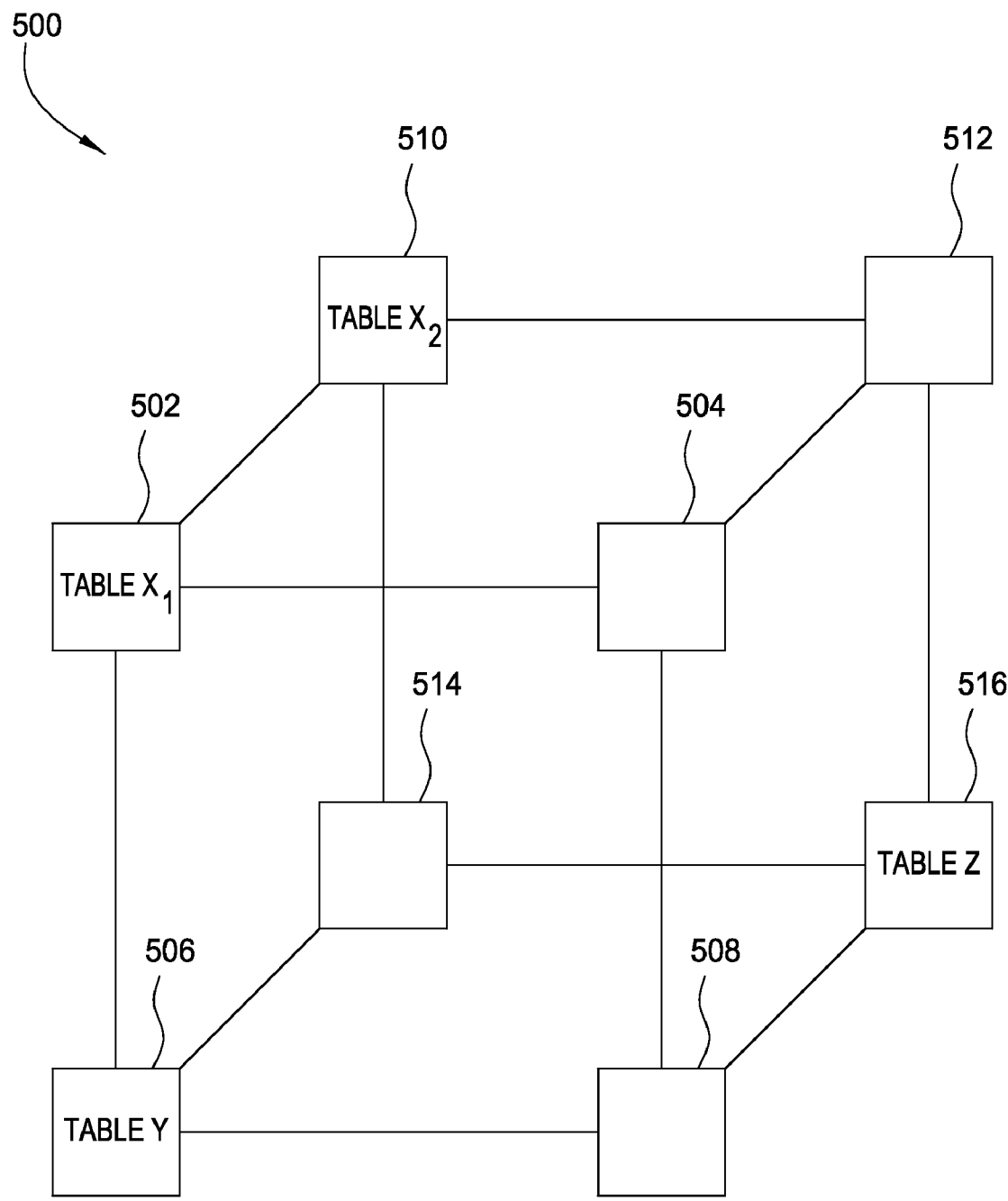
FIG. 5 is an illustration of a group of compute nodes, where data accessed by an atomic operation spans across a plurality of compute nodes, according to one embodiment of the invention.

FIG. 5 illustrates an example of a group of compute nodes, where data accessed by an atomic operation spans multiple compute nodes, according to one embodiment of the invention. Although FIG. 5 shows eight compute nodes (502, 504, 506, 508, 510, 512, 514, 516), it will be understood that the actual number of compute nodes in a parallel computing system is typically much larger, and that eight compute nodes (502, 504, 506, 508, 510, 512, 514, 516) are shown merely for illustrative purposes.

As shown, three compute nodes 502, 506, 510, and 516 contain data (Table $X_1$, Table $X_2$, Table Y, and Table Z, respectively) that may be accessed by an atomic operation. Because the data is located on multiple compute nodes 502, 506, 516, a two-phase commit protocol may be needed to ensure atomicity of a transaction performed using data on these three nodes. As discussed earlier, performing a two-phase commit may create substantial overhead. In an effort to avoid some of this overhead, the data may be consolidated onto a single compute node.

Figure 6:
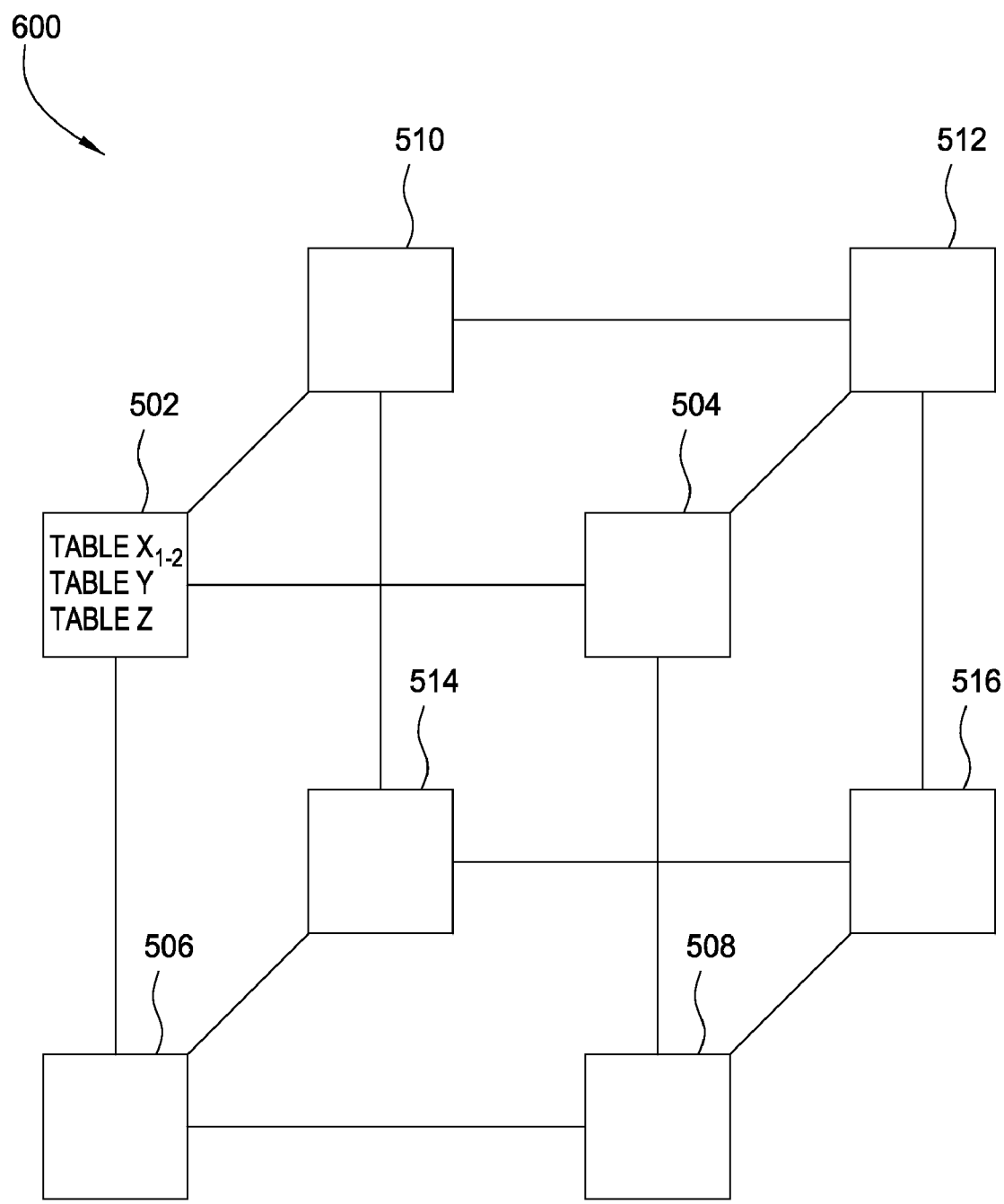
FIG. 6 illustrates a group of nodes where data is consolidated onto a single compute node.

Accordingly, FIG. 6 illustrates a group of nodes where the data is consolidated onto a single compute node. As shown, Table $X_{1-2}$, Table Y and Table Z are now all located on compute node 502. Therefore, only a single compute node 502 needs to be accessed to perform atomic transactions that access data on any one, two, or all three of these tables. As a result, a one-phase commit protocol can be used to ensure atomicity.

Advantageously, as described herein, embodiments of the invention reduce the number of two-phase commits required to perform atomic transactions in a multi-node system. By monitoring atomic operations that require two-phase commit protocols, a system may identify when it would be beneficial to consolidate data onto single (or at least fewer) compute node(s). In doing so, a less compute intensive commit protocol, such as a one-phase commit protocol may be used. Moreover, in situations where data consolidation is not available, the data may be migrated to compute nodes having a closer proximity. Thus, in such cases, network response times for two-phase commits required for an atomic operation may be reduced, thereby increasing the performance of a multi-node system.

While the foregoing is directed to embodiments of the present invention, other and further embodiments of the invention may be devised without departing from the basic scope thereof, and the scope thereof is determined by the claims that follow.

What is claimed is:

1. A computer-implemented method for reducing a number of two-phase commits required for atomic transactions performed on a multi-node computing system, comprising:
monitoring at least one atomic operation performed by at least a first compute node and a second compute node of the multi-node system, wherein the atomic operation is committed using a two-phase commit;
identifying data stored by the first and second compute node accessed in performing the atomic transaction; and
upon determining that the identified data on the first compute node and second compute node can be consolidated to a single compute node, consolidating the identified data to the single compute node, wherein subsequent atomic transactions performed using the consolidated data on the single compute node are committed using a one-phase commit.

2. The method of claim 1, further comprising:
upon determining that the identified data on the first compute node and the second compute node cannot be consolidated to the single compute node, identifying at least a third compute node and a fourth compute node having a closer proximity than a proximity of the first and second compute nodes;
transferring the identified data from the first compute node to the third compute node; and
transferring the identified data from the second compute node to the fourth compute node.

3. The method of claim 2, wherein the proximity of nodes is determined relative to one or more dimensional planes of a multi-dimensional torus connecting the plurality of compute nodes of the multi-node computing system.

4. The method of claim 2, wherein the proximity of nodes is determined relative to the network response times for data communications between the first compute node and the second compute node and the network response times for data communications between the third compute node and the fourth compute node.

5. The method of claim 1, wherein the atomic transaction is a database transaction, and wherein the first compute node and second compute node each store a portion of an in-memory database.

6. The method of claim 1, wherein a plurality of atomic transactions types is executed on the multi-node system, and wherein only atomic transactions of a specified type are monitored.

7. The method of claim 1, wherein the atomic transaction comprises a plurality of interdependent steps.

8. The method of claim 1, wherein the single compute node is selected as one of the first compute node and the second compute node.

9. A computer-readable storage medium containing a program which, when executed, performs an operation for reducing a number of two-phase commits required for atomic transactions performed on a multi-node computing system, comprising:
monitoring at least one atomic operation performed by at least a first compute node and a second compute node of the multi-node system, wherein the atomic operation is committed using a two-phase commit;
identifying data stored by the first and second compute node accessed in performing the atomic transaction; and
upon determining that the identified data on the first compute node and second compute node can be consolidated to a single compute node, consolidating the identified data to the single compute node, wherein subsequent atomic transactions performed using the consolidated data on the single compute node are committed using a one-phase commit.

10. The computer-readable storage medium of claim 9, wherein the operation further comprises:
upon determining that the identified data on the first compute node and the second compute node cannot be consolidated to the single compute node, identifying at least a third compute node and a fourth compute node having a closer proximity than a proximity of the first and second compute nodes;
transferring the identified data from the first compute node to the third compute node; and
transferring the identified data from the second compute node to the fourth compute node.

11. The computer-readable storage medium of claim 10, wherein the proximity of nodes is determined relative to one or more dimensional planes of a multi-dimensional torus connecting the plurality of compute nodes of the multi-node computing system.

12. The computer-readable storage medium of claim 10, wherein the proximity of nodes is determined relative to the network response times for data communications between the first compute node and the second compute node and the network response times for data communications between the third compute node and the fourth compute node.

13. The computer-readable storage medium of claim 9, wherein the atomic transaction is a database transaction, and wherein the first compute node and second compute node each store a portion of an in-memory database.

14. The computer-readable storage medium of claim 9, wherein a plurality of atomic transactions types is executed on the multi-node system, and wherein only atomic transactions of a specified type are monitored.

15. The computer-readable storage medium of claim 9, wherein the atomic transaction comprises a plurality of interdependent steps.

16. The computer-readable storage medium of claim 9, wherein the single compute node is selected as one of the first compute node and the second compute node.

17. A parallel computing system, comprising:
a plurality of compute nodes each having at least a processor and a memory storing a program configured to perform one or more steps of an atomic transaction using data stored on a respective one or more compute nodes;
an atomic transaction monitoring node, having at least a processor and a memory storing a program configured to perform an operation for reducing a number of two-phase commits required for atomic transactions performed on the plurality of compute nodes by performing the steps of:
monitoring at least one atomic operation performed by at least a first compute node and a second compute node of the multi-node system, wherein the atomic operation is committed using a two-phase commit;
identifying data stored by the first and second compute node accessed in performing the atomic transaction; and upon determining that the identified data on the first compute node and second compute node can be consolidated to a single compute node, consolidating the identified data to the single compute node, wherein subsequent atomic transactions performed using the consolidated data on the single compute node are committed using a one-phase commit.

18. The parallel computing system of claim 17, wherein the steps further comprises:
   upon determining that the identified data on the first compute node and the second compute node cannot be consolidated to the single compute node, identifying at least a third compute node and a fourth compute node having a closer proximity than a proximity of the first and second compute nodes;
   transferring the identified data from the first compute node to the third compute node; and
   transferring the identified data from the second compute node to the fourth compute node.

19. The parallel computing system of claim 18, wherein the proximity of nodes is determined relative to one or more dimensional planes of a multi-dimensional torus connecting the plurality of compute nodes of the multi-node computing system.

20. The parallel computing system of claim 18, wherein the proximity of nodes is determined relative to the network response times for data communications between the first compute node and the second compute node and the network response times for data communications between the third compute node and the fourth compute node.

21. The parallel computing system of claim 17, wherein the atomic transaction is a database transaction, and wherein the first compute node and second compute node each store a portion of an in-memory database.

22. The parallel computing system of claim 17, wherein a plurality of atomic transactions types is executed on the multi-node system, and wherein only atomic transactions of a specified type are monitored.

23. The parallel computing system of claim 17, wherein the atomic transaction comprises a plurality of interdependent steps.

24. The parallel computing system of claim 17, wherein the single compute node is selected as one of the first compute node and the second compute node.

* * * * *